United States Patent [19]

Hsueh et al.

[11] Patent Number: 5,926,635
[45] Date of Patent: *Jul. 20, 1999

[54] METHOD FOR REDUCING COMPLEXITIES WHEN COMMUNICATING BETWEEN TASKS

[75] Inventors: Canning Hsueh, Colorado Springs; Robert Kroboth, Monument, both of Colo.

[73] Assignee: Hewlett Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/796,007

[22] Filed: Feb. 5, 1997

Related U.S. Application Data

[51] Int. Cl.$^6$ .................................................. G06F 15/163
[52] U.S. Cl. ............................................ 395/680; 395/670
[58] Field of Search ..................................... 395/680, 681, 395/676, 200.08, 674, 670; 364/228.1, 240

[56] References Cited

U.S. PATENT DOCUMENTS

| 4,404,628 | 9/1983 | Angelo | 395/200.08 |
| 5,230,051 | 7/1993 | Quan | 395/680 |
| 5,437,031 | 7/1995 | Kitami | 395/680 |
| 5,446,881 | 8/1995 | Mammel, Jr. | 707/1 |

Primary Examiner—Majid A. Banankhah

[57] ABSTRACT

A system uses a resource manager class to allow each task to identify itself and establish OLE links. After each task starts, it calls the resource manager register object method in order to register itself with the resource manager. After registration the resource manager controls the OLE communication when any other task needs to communicate with the task. The system provides a new data object built upon the variant data structure supplied with the Microsoft foundation class (MFC) library. This new data structure is called a getset variant, and it encapsulates the identification of the sender of the data, an access key, used to control access between tasks, the OLE dispatch pointer necessary to access the receiver of the data, and a domain identifier which is used for communication across multiple computer systems.

6 Claims, 10 Drawing Sheets

METHOD FOR REDUCING COMPLEXITIES WHEN COMMUNICATING BETWEEN TASKS

FIELD OF THE INVENTION

This invention relates to computer systems and more particularly to operating systems. Even more particularly, the invention relates to exchanging information between OLE objects.

BACKGROUND OF THE INVENTION

The object linking and embedding (OLE) architecture provided by Microsoft Corporation within its Windows 3.1, Windows 95 and Windows NT operating systems is becoming more and more popular every day. The use of the OLE architecture to communicate between tasks within the operating system, however, is still very challenging to most programmers. That is, the learning curve is steep.

In order to facilitate software communication across OLE boundaries, the Microsoft foundation class (MFC) library, provided by Microsoft Corporation with its C++ compiler, provides a set of tools and classes to allow use of OLE. These allow function calls from one OLE object to another, and also provides a data structure, called a VARIANT, for use in passing data between OLE objects. These tools and classes are very general purpose, and nonexperienced users of OLE must spend considerable learning and experimenting with the classes before being able to adequately use OLE.

One problem with the variant structure provided by MFC is that it is difficult for a novice programmer to use.

Another problem with current OLE technology is that access to objects is not controlled, or is only controlled on an ac-hoc basis and is not consistent.

Thus, while OLE technology is very powerful, it is very difficult to learn and use. Therefore, there is need in the art for a method for providing an easy interface which encapsulates most of the complexities involved in communications between OLE objects. The present invention meets these and other needs in the art.

SUMMARY OF THE INVENTION

It is an aspect of the present invention to exchange information between tasks in an operating system or across a network.

It is another aspect of the invention to exchange such information between OLE objects within such tasks.

Another aspect of the invention is to simplify the data structure used to exchange such information.

Still another aspect is to provide access control between the tasks.

The above and other aspects of the invention are accomplished in a system that uses a resource manager class and a system object to allow each task to identify itself and establish OLE links. After each task starts, it calls the register object method of the resource manager which registers the task with the system object. During the registration process, the resource manager receives information from the system object that allows the task to communicate to other tasks using OLE and thereafter the resource manager controls the OLE communication when the task needs to communicate with another task.

To further facilitate communication, the present invention provides an object that is built upon the variant data structure supplied with the Microsoft foundation class (MFC) library. This new object is called a getset variant, and it encapsulates the identification of the sender of the data, an access key, the OLE dispatch pointer necessary to access the receiver of the data, and a domain identifier which is used for communication across multiple computer systems. In addition to these four fixed elements within the getset variant object, whenever a task builds a new getset variant, it identifies a number of additional elements to be included within the data structure of the getset variant object. Thus, the present invention encapsulates the variant data structure. To the user of the invention, the getset variant behaves as a one-dimensional array, where the elements can be of different types, and where the number of elements can be dynamically changed. Also, the getset variant object provides methods to store and retrieve any data element, thus encapsulating the elements and their storage format.

The access key element within the getset variant is used to control access from one task to another. Before a task is allowed to get or set data to a second task, it must have a key that allows it to access the second task. The key controls whether the access is read only, write only, or both.

The domain element within the getset variant is used to control access across sets of computer systems. Before a task is allowed to get or set data to a second task, it must have a domain value that allows it to access the second task.

After all tasks have registered themselves with the system object through their resource managers, one task need only call a simple get or set subroutine within its resource manager to pass a getset variant to a second task. Before passing the variant, however, the resource manager checks the access keys to make sure that the access is allowed.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
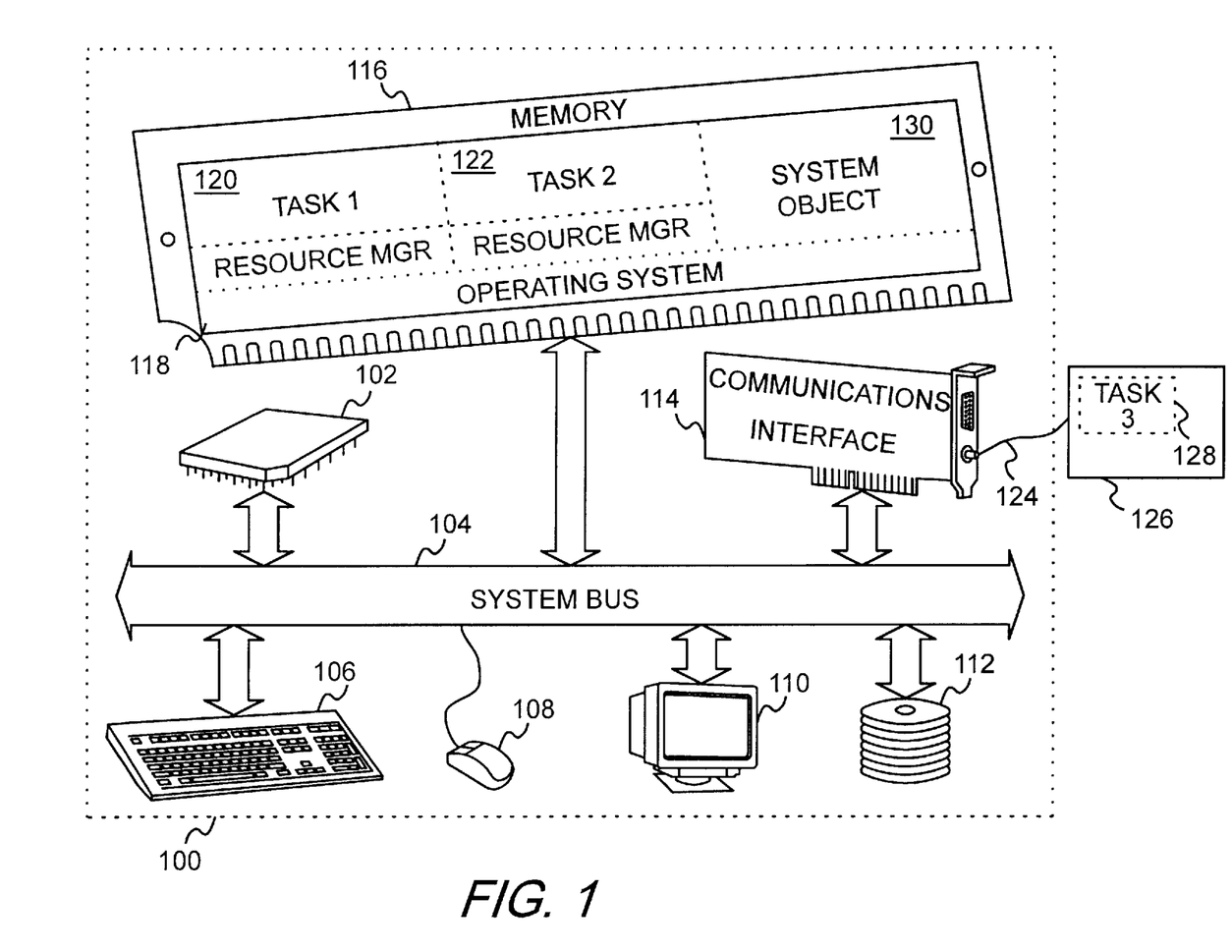
FIG. 1 shows a block diagram of a computer system incorporating he present invention.

FIG. 1 shows a block diagram of a computer system incorporating the present invention. Referring now to FIG. 1, a computer system 100 contains a processing element 102 which communicates to other elements of the computer system 100 over a system bus 104. A keyboard 106 and a mouse device 108 allow input to the computer system 100 while a graphics device 110 allows software within the computer 100 to output information to a user of the computer system 100. A disk 112 stores data and software within the computer system 100.

A memory 116 contains an operating system 118, which is a windows operating from Microsoft Corporation, which incorporates OLE technology, such as Windows 3.1, Windows 95 or Windows NT. Memory 116 also contains a task 1 120 and a task 2 122 which need to communicate using the object linking and embedding protocol provided within the operating system 118. Each task further includes a resource manager within the task. The memory 116 also contains a system object 130 which is used within the present invention to facilitate the OLE communications.

Computer system 100 also contains a communications interface 114 which allows the computer system 100 to communicate to a second computer system 126 over a network 124. The network 124 may be a local area network, or a wide area network. Using the communications interface 114, the resource manager can provide facilities to allow task 1 120 or task 2 122 within the computer system 100 to communicate to a task 3 128 within the second computer system 126.

Figure 2:
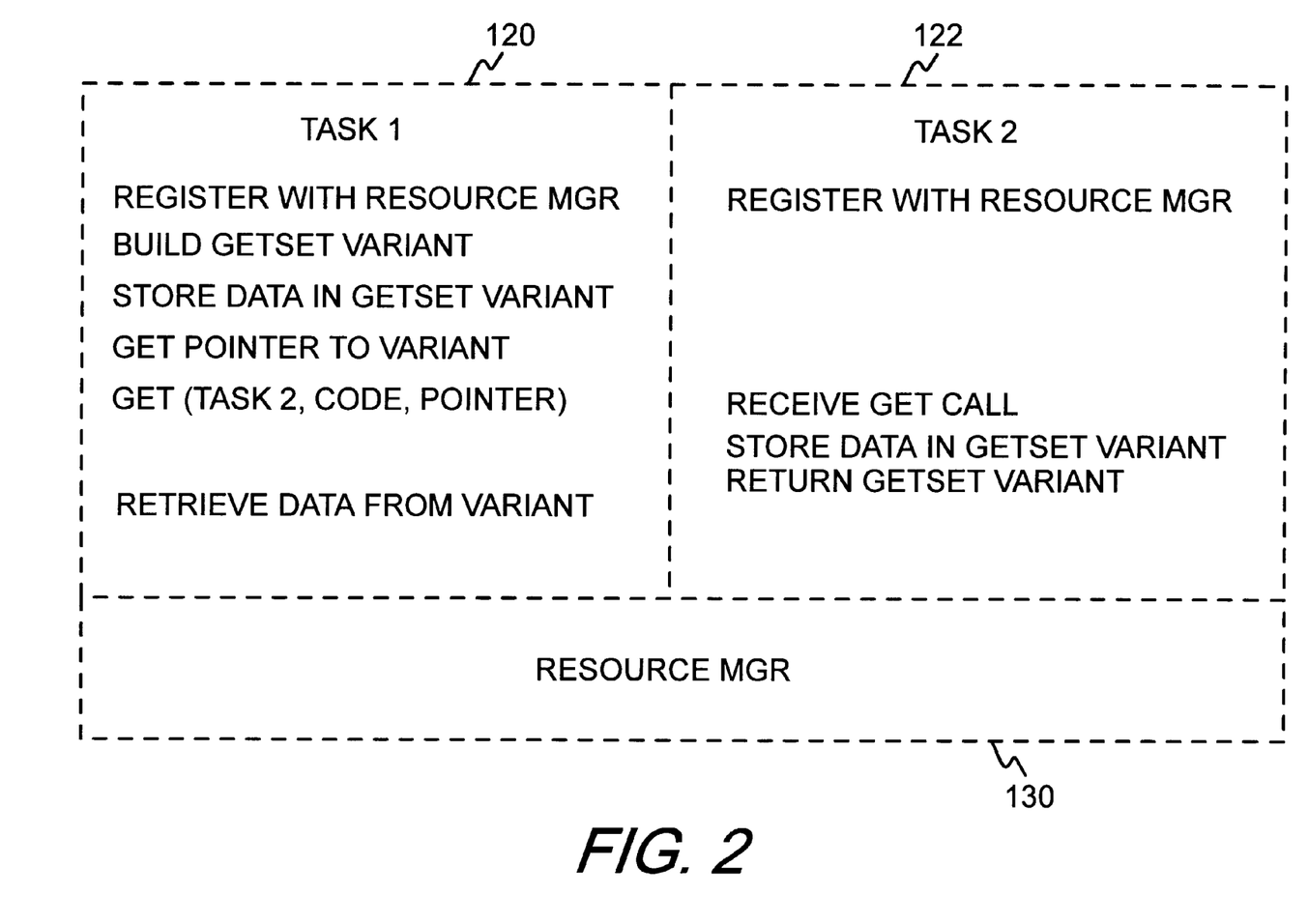
FIG. 2 shows an example of the order of events when communicating between tasks using the present invention.

FIG. 2 shows an example of the order of events when communicating between tasks using the present invention. Referring now to FIG. 2, two columns are shown, one for task 1 120 and a second column for task 2 122. In order to start the communications process, both task 1 and task 2 must register with the resource manager. Once this registration process is complete, task 1 builds a getset variant data structure within a getset variant object, as will be more fully described below. Task 1 then stores data in the getset variant, and then gets a pointer to the data structure of the getset variant object. Task 1 then calls the get subroutine within the resource manager 130 to communicate to task 2 passing a code which is used to identify the type of request that task 1 is requiring, and a pointer to the getset variant data structure obtained in the line above. The get subroutine within the resource manager of the task calls the system object 130 to identify task 2 within its registration database, and passes the code and pointer information to task 2 which receives the get call. Task 2 then stores data in the getset variant data structure and returns the getset variant data structure to the resource manager which in turn returns the getset variant to task 1. Task 1 then retrieves data from the getset variant data structure and processes it as desired.

Figure 3:
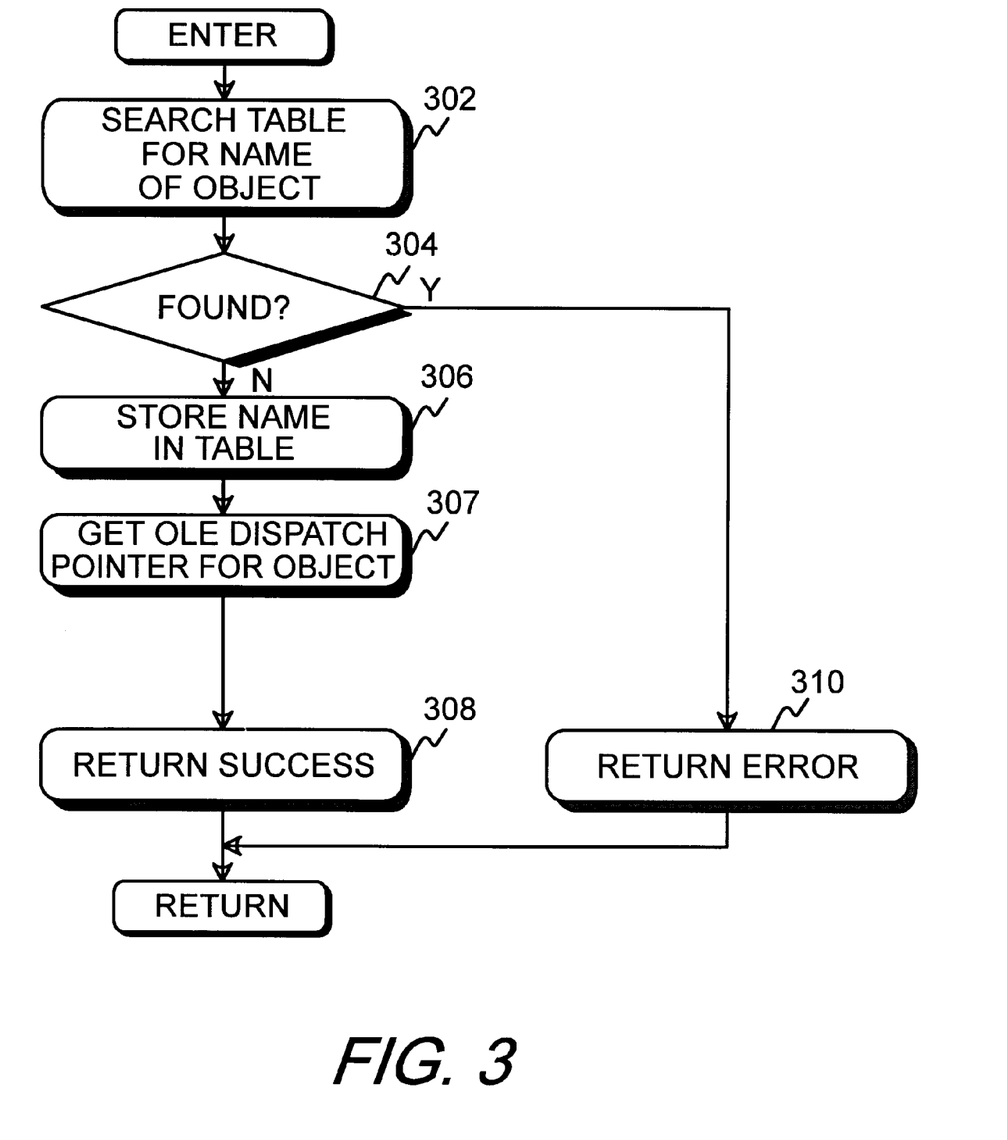
FIG. 3 shows a flowchart of the register object process.

FIG. 3 shows a flowchart of the register object process performed by the resource manager and the system object. Referring now to FIG. 3, when a task desires to register itself, it calls FIG. 3 and after entry, block 302 searches a registration list table for the name of the task or object that is registering itself. Block 304 determines if that name is found, and if it is, block 304 goes to block 310 which returns an error since only one instance of a name can be registered at a time.

If the name was not found in the registration list table, block 304 goes to block 306 which creates a new entry at the tail of the table, and stores the name of the object in the registration list table. Block 307 then gets an OLE dispatch pointer for the object, so that the resource manager knows how to access the object for future calls. After storing the dispatch pointer within the registration list table, block 308 returns a success indicator to the task.

The OLE dispatch pointer is obtained by calling the system object 130 (FIG. 1), which is located in a different task within the computer system 100. Since all tasks register with the system object, the resource manager can obtain an OLE dispatch pointer to any other task from the system object. Since only one copy of the system object exists within the computer system, OLE can easily be used to call the system object to obtain OLE dispatch pointers to any other registered object.

Figure 4:
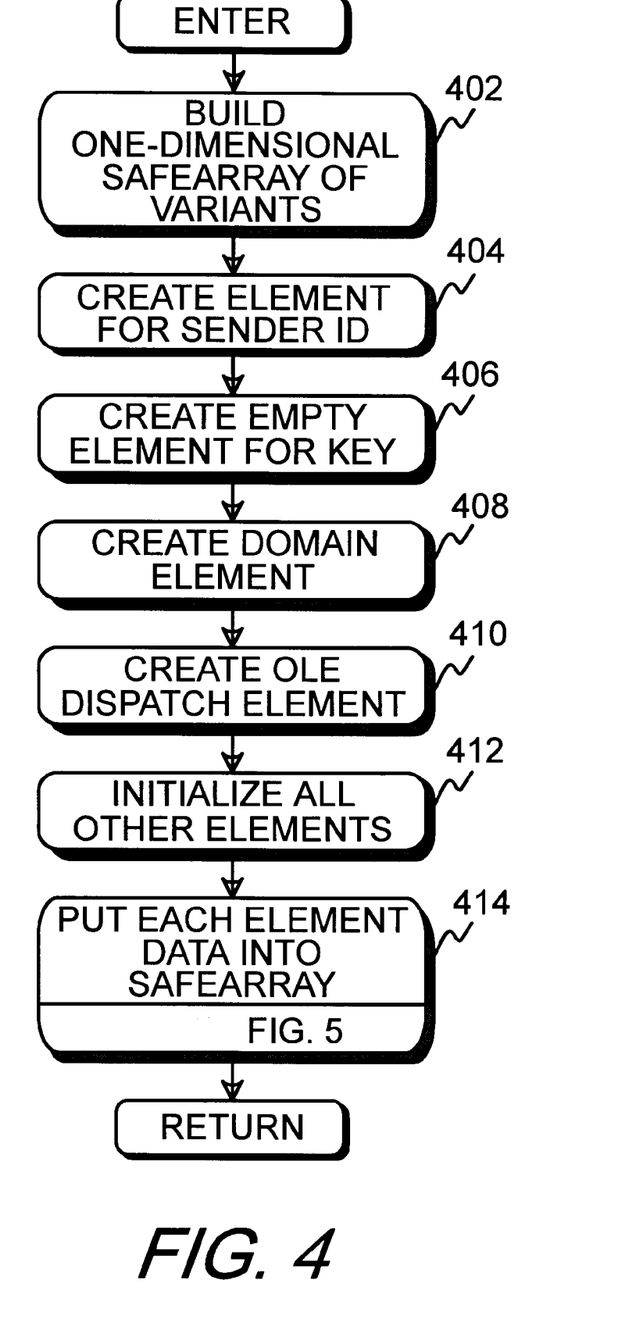
FIG. 4 shows a flowchart of the build getset variant process.

FIG. 4 shows a flowchart of the build getset variant process. A VARIANT structure is available within the Microsoft foundation class (MFC) library and it is used to pass information within the OLE environment. This structure comprises a type indicator which indicates the type of data stored in a second area of the variant. The second area of the variant is a union of all the different types of data that can be stored in the variant. The variant structure as defined by the MFC library, comprises other elements not discussed. A complete description of the variant structure can be found in the Microsoft foundation class library available with the Microsoft C++ compiler from Microsoft Corporation.

To store data in the variant type, the type of data being stored is first stored in the type indicator, and then the actual data is stored in the union. For example, to store a long integer within a variant, first a long integer type indicator is stored in the type indicator field, and then the long integer is stored within the union.

The present invention extends the variant concept to create a getset variant object. The data structure within the getset variant object comprises four fixed elements, and a variable length safearray of a number of variants as requested by the function that creates the getset variant.

Referring to FIG. 4, after entry, block 402 builds a one-dimensional safearray of variants as part of the getset variant structure. A safearray is a class provided within the Microsoft foundation class library. Those skilled in the art will recognize that a safearray is not necessary, and that an ordinary array could be used.

The number of elements in the safearray is four plus the number of elements requested by the function calling FIG. 4. The first four elements of the array are reserved as will be described below, and other elements in the safearray are used by the function building the getset variant.

After building the array, block 404 creates and initializes the first element to hold the sender identifier within the safearray. This identifier is used by the receiver of the getset variant to know who sent the getset variant data structure. Block 406 then creates an empty element for the access key, used to control whether access between two tasks is read only, write only, or both. Block 408 then creates a domain element as the third element of the safearray. The domain element defines the domain of communication. For example, one domain would be within a particular computer system. A second domain might be within a particular sub-set of a network, etc. Block 410 then creates an element to hold the OLE dispatch pointer. Block 412 then initializes all the other elements to prepare them for holding data. Block 414 then calls FIG. 5 for each data element that is to be placed in the safearray. After the data elements have been placed into the safearray, block 414 returns to the caller.

After building the getset variant object, a task can store data into any of the individual elements of the safearray, including the four fixed elements. This is done by calling methods within the getset variant object to store each type of data, and identifying which element is to receive the data. Similarly, the data from any element can be retrieved using methods within the getset variant class.

Figure 5:
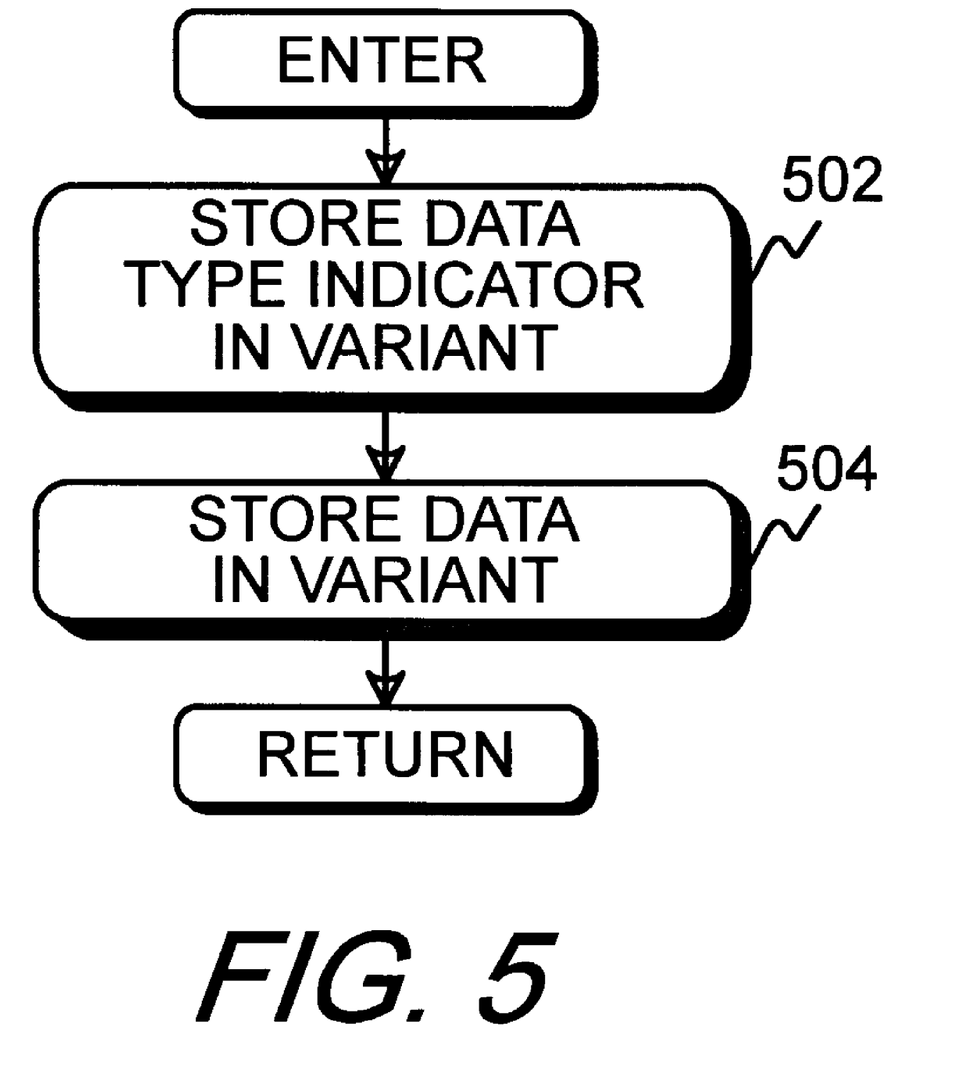
FIG. 5 shows a flowchart of the store data process called from FIG. 4.

FIG. 5 shows a flow chart of the store data process called from block 414 of FIG. 4. Referring now to FIG. 5, after entry, block 502 stores a data type indicator in the variant and block 504 stores the actual data within the variant as described above.

Thus, the getset variant is a safearray with four fixed elements, and a variable number of variant elements.

Figure 6:
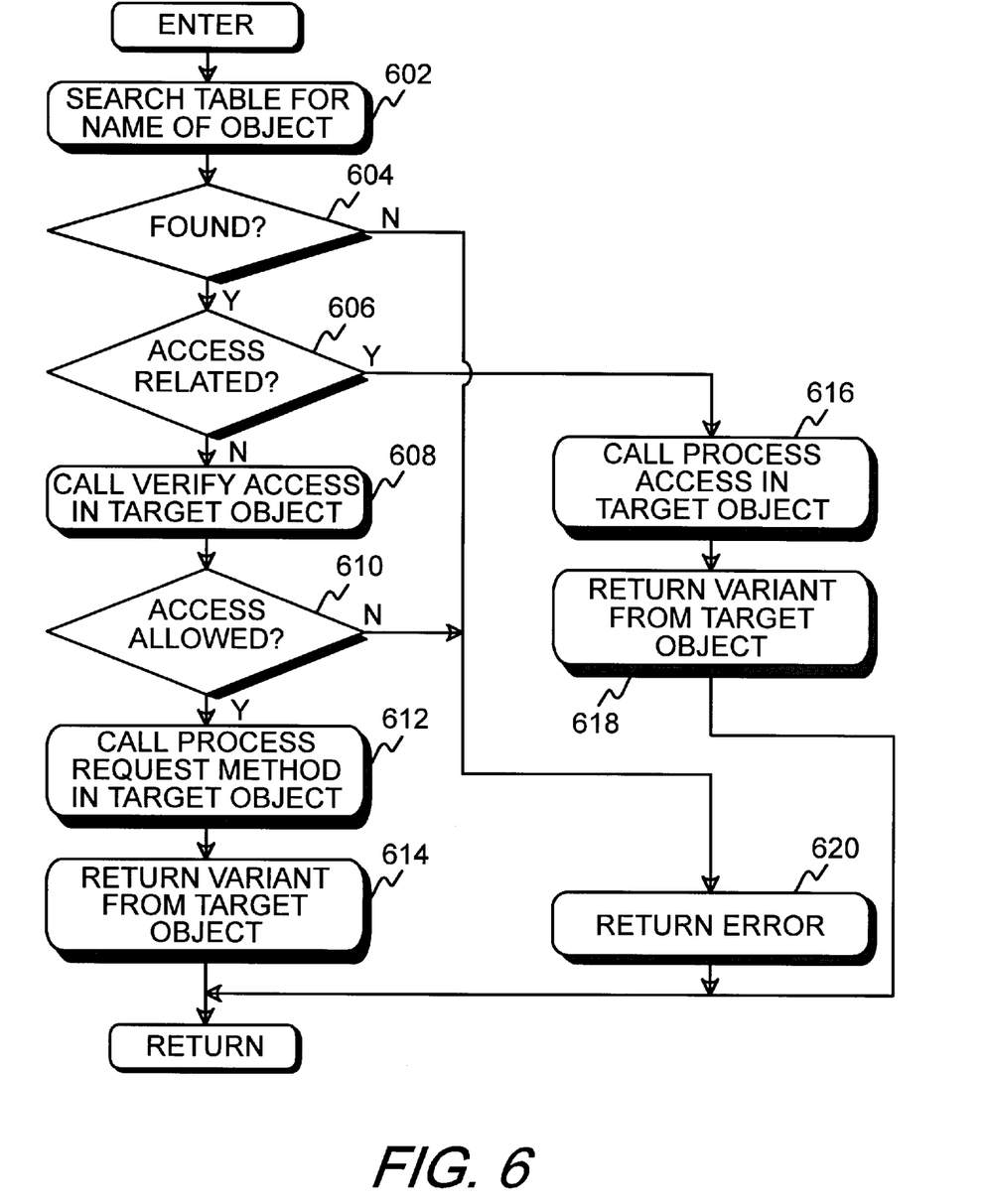
FIG. 6 shows a flowchart of the get function within the resource manner.

FIG. 6 shows a flowchart of the get function within the resource manager. As described above with respect to FIG. 2, after a task has built a getset variant data structure to be passed to a second task, it calls the get function. Referring now to FIG. 6, after entry, block 602 searches the registration list table built in FIG. 3, to determine if the name of the target object, i.e. the task that is to receive the data, is contained within the table. Block 604 determines whether the name is found, and if not, block 604 goes to block 620 which returns an error since communication is not possible to an unknown object.

If the name is in the table, block 604 goes to block 606 which determines whether the get call is access related. This is determined by looking at the second parameter of the get call, described above with respect to FIG. 2 as the code parameter. If the get call is access related, block 606 goes to block 616 which calls the process access method within the target object. This is used to allow the target object to determine whether it will allow the access. This method will be described below with respect to FIG. 8. After returning from the process access method, block 618 returns the variant from the target object to the caller. If the access will be allowed, the getset variant will contain a valid access key for the type of access requested.

If the get call is not access related, block 606 goes to block 608 which calls the verify access method in the target object to determine if it will allow this get call. The verify access process is explained below with respect to FIG. 9. Block 610 then determines whether the target object will allow the access, and if not, block 610 goes to block 620 which returns an error to the caller.

If the target object will allow the access, block 610 goes to block 612 which calls the process request method in the target object to cause it to process the getset variant that is being passed. This method is described below with respect to FIG. 9. After returning from the call to the target object, block 614 then returns the variant from the object to the caller.

Figure 7:
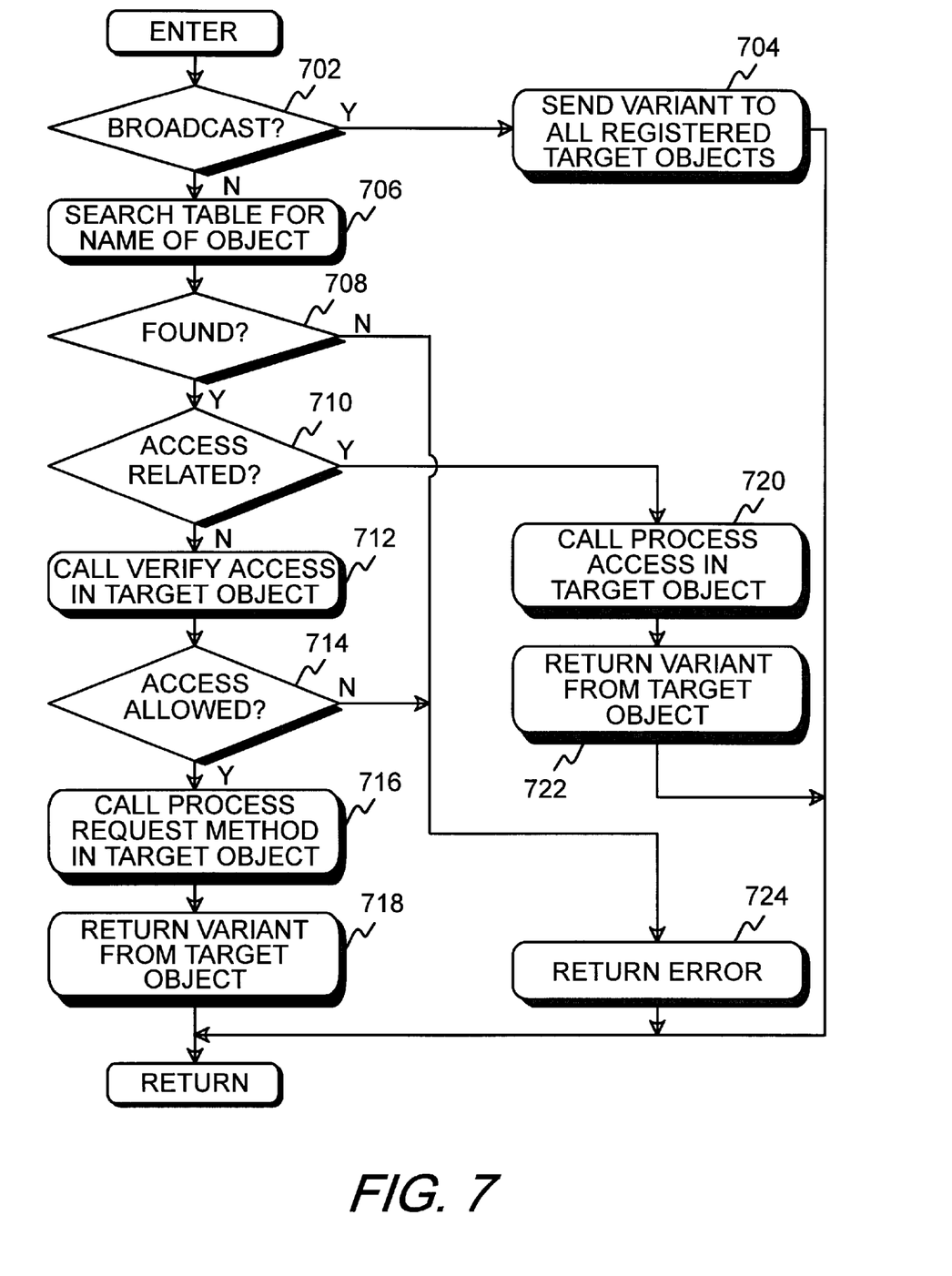
FIG. 7 shows a flowchart of the set function within the resource manager.

FIG. 7 shows a flowchart of the set function within the resource manager. After a task has built a getset variant to be passed to a second task, it calls the set function to send the getset variant data structure to a second task. Referring now to FIG. 7, after entry, block 702 determines whether the set request is for a broadcast to all registered objects. If so, block 702 goes to block 704 which sends the getset variant to all objects that have registered with the system object, and then block 704 returns to the caller.

If the request is not a broadcast request, block 706 searches the registration list table built in FIG. 3, to determine if the name of the target object is contained within the table. Block 708 determines whether the name is found, and if not, block 708 goes to block 724 which returns an error since communication is not possible to an unknown object.

If the name is in the table, block 708 goes to block 710 which determines whether the get call is access related. This is determined by looking at the second parameter of the get call, described above with respect to FIG. 2 as the code parameter. If the get call is access related, block 710 goes to block 720 which calls the process access method within the target object. This is used to allow the target object to determine whether it will allow the access. This method will be described below with respect to FIG. 8. After returning from the process access method, block 722 returns the variant from the target object to the caller. If the access will be allowed, the getset variant will contain a valid access key.

If the get call is not access related, block 710 goes to block 712 which calls the verify access method in the target object to determine if it will allow this set call. The verify access process is explained below with respect to FIG. 9. Block 714 then determines whether the target object will allow the access, and if not, block 714 goes to block 724 which returns an error to the caller.

If the target object will allow the access, block 714 goes to block 716 which calls the process request method in the target object to cause it to process the getset variant that is being passed. This method is described below with respect to FIG. 9. After returning from the call to the target object, block 718 then returns the variant from the object to the caller. Although the variant data structure is returned, it has not been altered by the target object.

Figure 8:
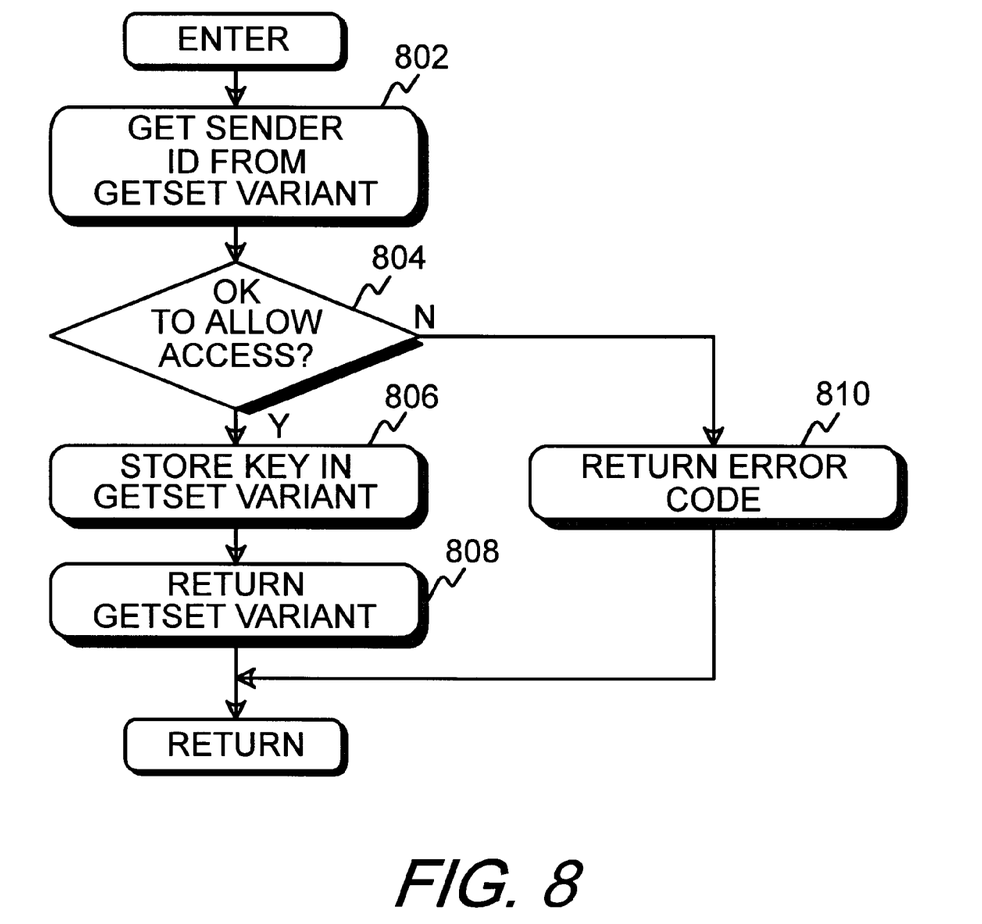
FIG. 8 shows a flowchart of the verify access method within each object.

FIG. 8 shows a flowchart of the verify access function within the target object, as will be called from block 616 and block 716 of FIG. 6 and 7 respectively. Referring now to FIG. 8, after entry, block 802 gets the sender ID from the getset variant, and block 804 determines whether this sender will be allowed access to the target object. If not, block 804 goes to block 810 which returns an error code. If this sender will be allowed access, block 804 goes to block 806 which stores the access key in the getset variant, that is in the access key element at the beginning of the getset variant, and then block 808 returns the getset variant to the caller.

Figure 9:
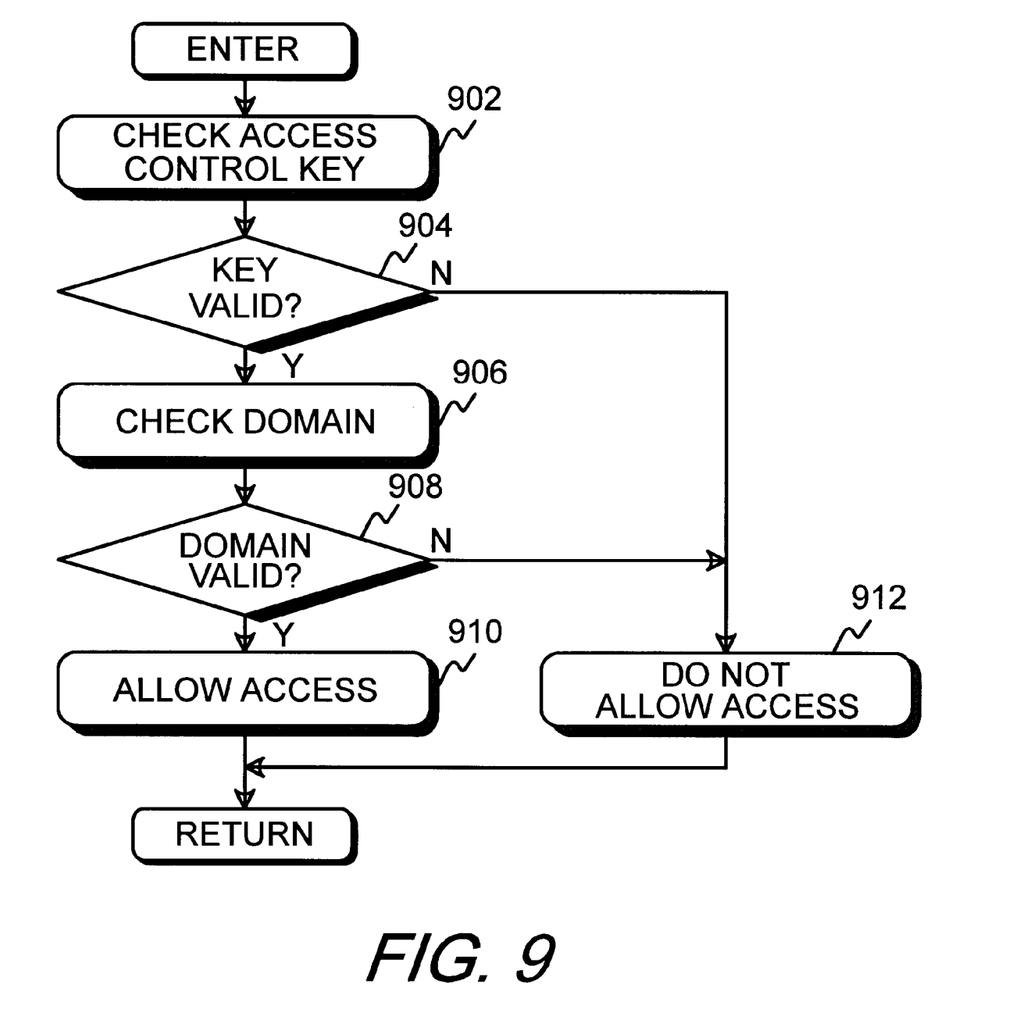
FIG. 9 shows a flowchart of the verify access process called from FIGS. 6 and 7.

FIG. 9 shows a flowchart of the verify access method within the target object. This is the method called by block 610 and block 712 of FIGS. 6 and 7 respectively. Referring now to FIG. 9, after entry, block 902 checks the access key in the getset variant data structure passed with the call. If the access key is incorrect for the operation, block 904 goes to block 912 to return an error.

If the access will be allowed, block 904 goes to block 906 which checks the domain value in the getset variant data structure passed with the call. If the domain is not correct, block 908 goes to block 912 to return an error.

If the access key and domain are correct, control goes to block 910 to allow the access.

Figure 10:
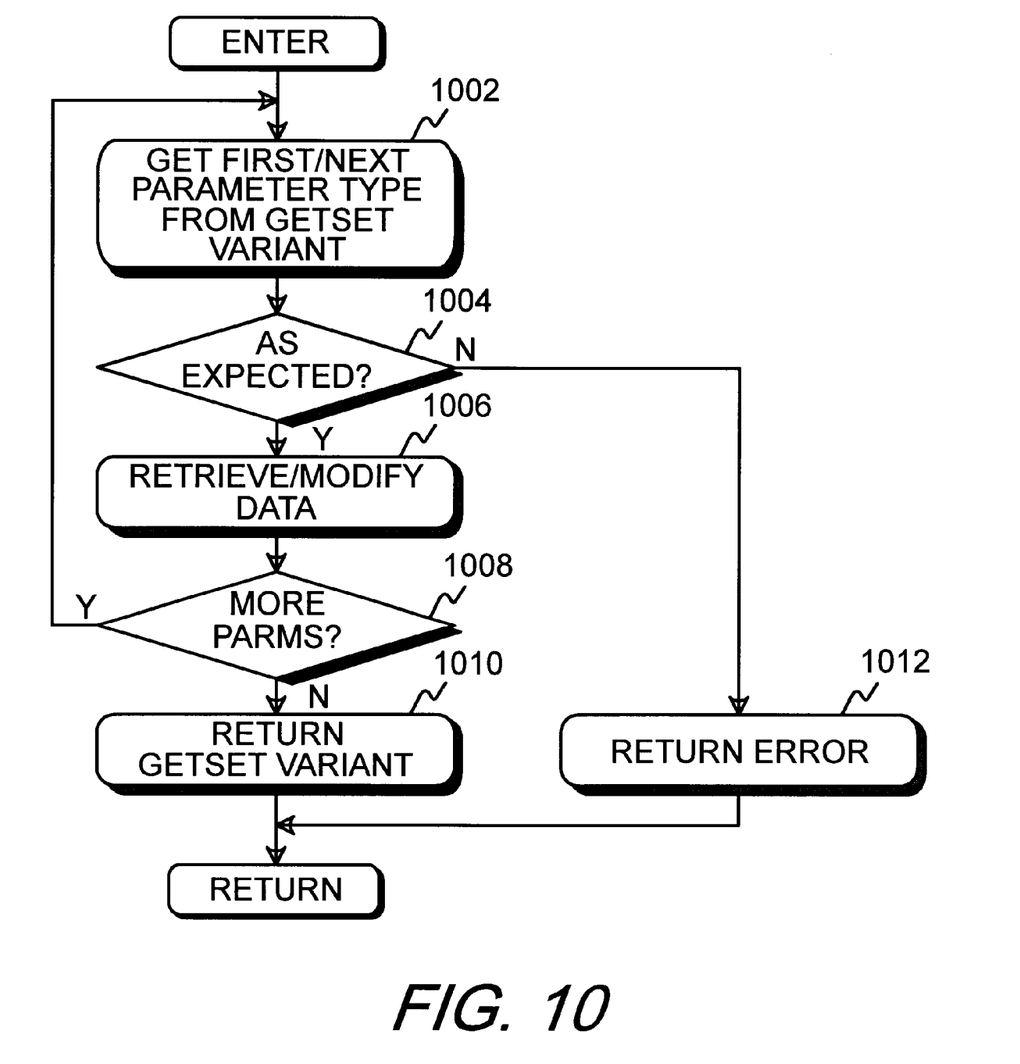
FIG. 10 shows a flowchart of the process request method within each object.

FIG. 10 shows a flowchart of the process request method within the target object. Referring to FIG. 10, after entry, block 1002 which gets the first or next parameter from the getset variant data structure. These are the parameters being passed between the two tasks, and does not include the four fixed parameters used in the task communication itself. After getting the first or next parameter, block 1004 determines whether this is the parameter expected by the target object, and if not, block 1004 goes to block 1012 which returns an error. If the parameter is the one expected, and of the type expected, block 1004 goes to block 1006 which retrieves or modifies the data depending upon the code sent in the request. Block 1008 then determines whether there are more parameters to be processed, and if there are, block 1008 returns to block 1002 to process the next parameter. After all parameters have been processed, block 1008 goes to block 1010 to return the getset variant.

If the request is a get request, the process of FIG. 10 processes as described above. If, however, the request is a set request, block 1006 does not store data into the getset variant that is returned in block 1010, since a set request does not return information back to the caller.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A method for communicating between a first task and a second task within a network of computer systems, said method comprising the steps of:
   (a) storing a task name, an access key, and an address of said first task and said second task in an entry of a common area located on one of said computer systems within said network of computer systems, wherein said access keys control whether said first task may perform a set operation to send data to said second task, perform a get operation to receive data from said second task, or perform both said get operation and said set operation;
   (b) when an access key for said first task contains a value that allows said first task to set data to said second task, sending data from said first task to said second task comprising the steps of
      (b1) locating an entry for said second task in said common area, and
      (b2) sending said data from said first task to said second task through said address within said entry for said second task; and
   (c) when an access key for said first task contains a value that allows said first task to get data from said second task, receiving data from said second task into said first task comprising the steps of
      (c1) locating an entry for said second task in said common area, and
      (c2) receiving said data from said second task into said first task through said address within said entry for said second task.

2. The method of claim 1 wherein said common area further comprises a domain key for said first task and said second task wherein said domain key controls whether said first task may perform said set operation or said get operation with said second task when said second task is located in a second computer system within said network of computer systems.

3. The method of claim 1 further comprising:
   (d) sending data from a first task to all other tasks comprising the steps of
      (d1) locating an entry for each other task in said common area, and
      (d2) sending said data from said first task to each task located in step (d1) through said address contained in each entry located in step (d1).

4. A method for communicating between a first task and a second task, each operating in separate computer systems, wherein said separate computer systems operate over a network, said method comprising the steps of:
   (a) storing a task name, a domain key, and an address of both said first task and said second task in an entry of a common area located on one of said computer systems, wherein said domain key controls whether said first task may communicate with said second task;
   (b) when a domain key of said first task allows said first task to communicate with said second task, sending data from said first task to said second task comprising the steps of
      (b1) locating an entry for said second task in said common area,
      (b2) sending said data from said first task to said second task through said address within said entry for said second task; and
   (c) when a domain key of said first task allows said first task to communicate with said second task, receiving data within said first task from said second task comprising the steps of
      (c1) locating an entry for said second task in said common area, and
      (c2) receiving said data from said second task into said first task through said address within said entry for said second task.

5. The method of claim 4 wherein said common area further comprises an access key for each task, wherein said access key controls whether said first task may set data into said second task, get data from said second task, or perform both said set and said get.

6. The method of claim 4 further comprising:
   (d) sending data from a first task to all other tasks comprising the steps of
      (d1) locating an entry for each other task in said common area, and
      (d2) sending said data from said first task to each task located in step (d1) through said address contained in each entry located in step (d1).

* * * * *